US012705058B2

(12) United States Patent
Rooney et al.

(10) Patent No.: US 12,705,058 B2
(45) Date of Patent: Aug. 11, 2026

(54) APPARATUSES, SYSTEMS, AND METHODS FOR MODE REGISTER PAGE ACCESS MODES

(71) Applicant: MICRON TECHNOLOGY, INC., Boise, ID (US)

(72) Inventors: Randall J. Rooney, Boise, ID (US); David R. Brown, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 31 days.

(21) Appl. No.: 19/032,886

(22) Filed: Jan. 21, 2025

(65) Prior Publication Data

US 2025/0278276 A1 Sep. 4, 2025

Related U.S. Application Data

(60) Provisional application No. 63/561,159, filed on Mar. 4, 2024.

(51) Int. Cl.
*G06F 9/30* (2018.01)
*G06F 9/355* (2018.01)

(52) U.S. Cl.
CPC .......... *G06F 9/30189* (2013.01); *G06F 9/355* (2013.01)

(58) Field of Classification Search
CPC .......................... G06F 9/30189; G06F 9/355
See application file for complete search history.

(56) References Cited

U.S. PATENT DOCUMENTS 10,141,034 B1 * 11/2018 Zitlaw ................ G06F 11/3055
11,983,411 B2 * 5/2024 Hata .................. G06F 13/1694

* cited by examiner

*Primary Examiner* — Nicholas A. Paperno
(74) *Attorney, Agent, or Firm* — Dorsey & Whitney LLP

(57) ABSTRACT

Embodiments disclosed herein provide techniques for entering, remaining, and exiting a mode register page access (MRPA) mode in a semiconductor device (e.g., a memory device). A command is used to cause the memory device to enter the MRPA mode when accessing the mode register, and a subsequent command is used to cause the memory device to remain in the MRPA mode for continued access to the mode register. While in the MRPA mode, subsequent commands enable the memory device to be accessed using a mode register address for a read command, or a mode register address and an operation code (OP code) for a write command.

23 Claims, 6 Drawing Sheets

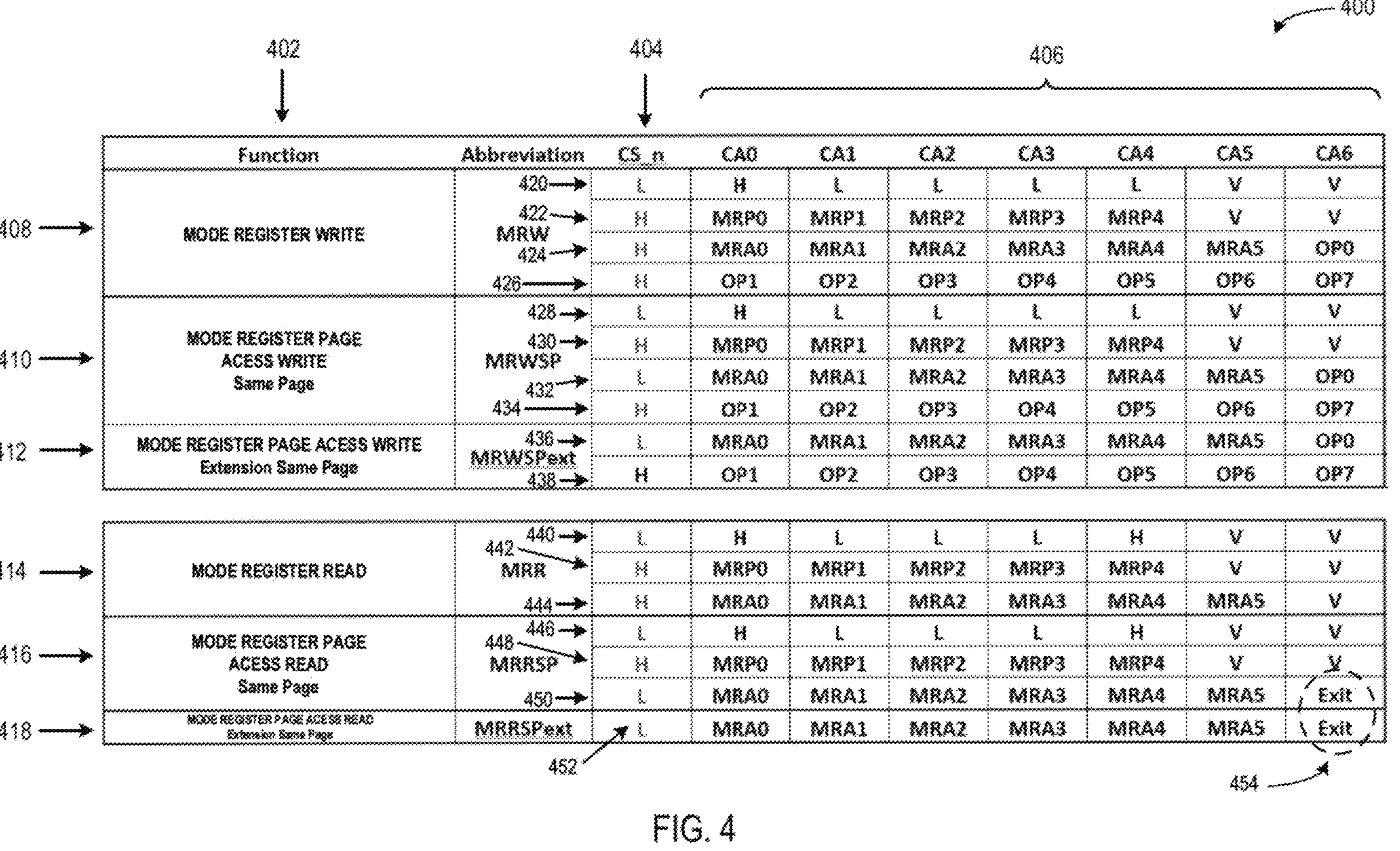

| Function | Abbreviation | CS_n | CA0 | CA1 | CA2 | CA3 | CA4 | CA5 | CA6 |
|---|---|---|---|---|---|---|---|---|---|
| MODE REGISTER WRITE | MRW | L | H | L | L | L | L | V | V |
| | | H | MRP0 | MRP1 | MRP2 | MRP3 | MRP4 | V | V |
| | | H | MRA0 | MRA1 | MRA2 | MRA3 | MRA4 | MRA5 | OP0 |
| | | H | OP1 | OP2 | OP3 | OP4 | OP5 | OP6 | OP7 |
| MODE REGISTER PAGE ACESS WRITE Same Page | MRWSP | L | H | L | L | L | L | V | V |
| | | H | MRP0 | MRP1 | MRP2 | MRP3 | MRP4 | V | V |
| | | L | MRA0 | MRA1 | MRA2 | MRA3 | MRA4 | MRA5 | OP0 |
| | | H | OP1 | OP2 | OP3 | OP4 | OP5 | OP6 | OP7 |
| MODE REGISTER PAGE ACESS WRITE Extension Same Page | MRWSPext | L | MRA0 | MRA1 | MRA2 | MRA3 | MRA4 | MRA5 | OP0 |
| | | H | OP1 | OP2 | OP3 | OP4 | OP5 | OP6 | OP7 |
| MODE REGISTER READ | MRR | L | H | L | L | L | H | V | V |
| | | H | MRP0 | MRP1 | MRP2 | MRP3 | MRP4 | V | V |
| | | H | MRA0 | MRA1 | MRA2 | MRA3 | MRA4 | MRA5 | V |
| MODE REGISTER PAGE ACESS READ Same Page | MRRSP | L | H | L | L | L | H | V | V |
| | | H | MRP0 | MRP1 | MRP2 | MRP3 | MRP4 | V | V |
| | | L | MRA0 | MRA1 | MRA2 | MRA3 | MRA4 | MRA5 | Exit |
| MODE REGISTER PAGE ACESS READ Extension Same Page | MRRSPext | L | MRA0 | MRA1 | MRA2 | MRA3 | MRA4 | MRA5 | Exit |

FIG. 4

APPARATUSES, SYSTEMS, AND METHODS FOR MODE REGISTER PAGE ACCESS MODES

CROSS-REFERENCE TO RELATED APPLICATIONS

This application claims the filing benefit of U.S. Provisional Application No. 63/561,159, filed Mar. 4, 2024. The Provisional Application is incorporated by reference herein in its entirety and for all purposes.

BACKGROUND

A semiconductor memory device may include a number of mode registers which are used to store information, such as configuration and status information in the form of operation (OP) codes represented by binary digits (or “bits”). Typically, in a dynamic random access memory (DRAM), when information in a mode register is written to or read from a particular address in the mode register, a full command is transmitted to the semiconductor memory device. For a mode register read operation, the full command includes the command and the mode register address. For a mode register write operation, the full command includes the command, the mode register address, and the OP code to be written to the mode register. As the number of mode registers in a semiconductor memory device increases, the requirement for the full command data for each read and write operation can result in slower mode register read and write operations.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the Figures.

FIG. 4 illustrates a first example of a command truth table according to an embodiment of the disclosure;

DETAILED DESCRIPTION

Embodiments disclosed herein provide techniques for entering, remaining, and exiting a mode register page access (MRPA) mode in a semiconductor device (e.g., a memory device). In some embodiments of the disclosure, the MRPA mode refers to the execution or the performance of multiple MRPA write operations to the same page or MRPA read operations from the same page. A command is used to cause the memory device to enter the MRPA mode when accessing the mode register, and a subsequent command is used to cause the memory device to remain in the MRPA mode for continued access to the mode register. While in the MRPA mode, subsequent commands enable the memory device to be accessed using a mode register address for a read command, or a mode register address and an operation code (OP code) for a write command.

Figure 1:
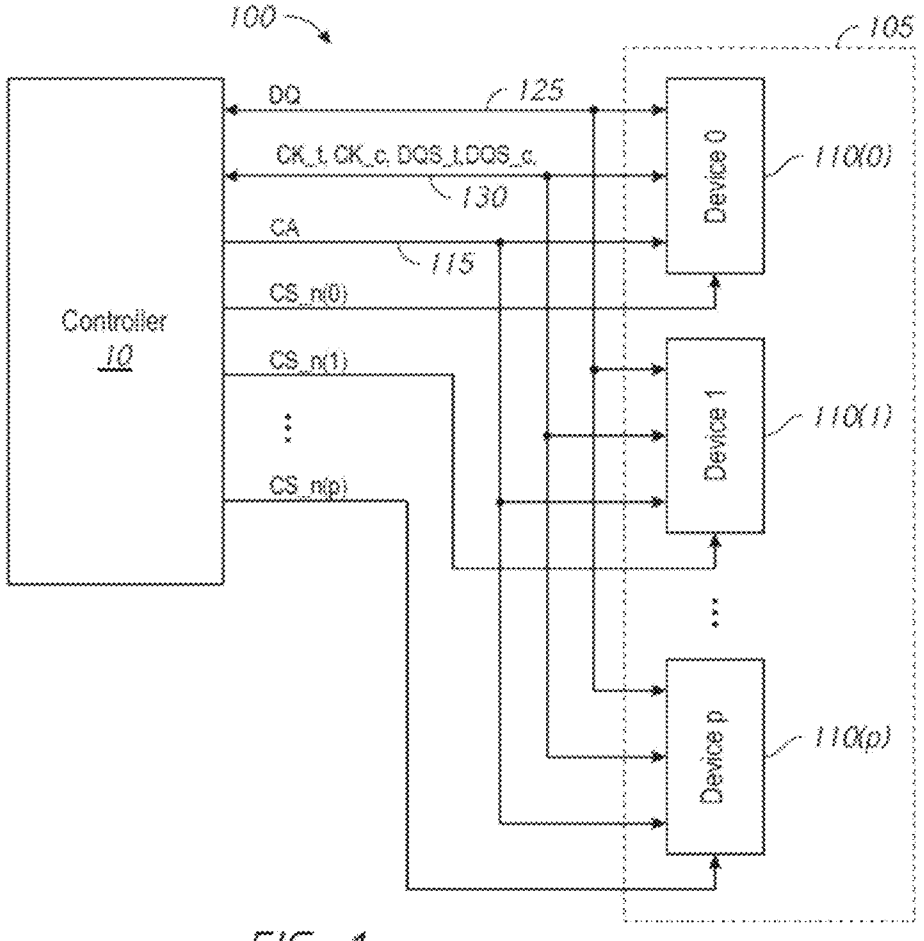
FIG. 1 illustrates a block diagram of an example system according to an embodiment of the disclosure.

FIG. 1 illustrates a block diagram of an example system 100 according to an embodiment of the disclosure. The system 100 includes a controller 10 and a memory system 105. The memory system 105 includes memories 110(0)-110(*p*) (e.g., “Device 0” through “Device p”), where p is a number of the memories. The memories 110(0)-110(*p*) may be dynamic random access memory (DRAM). The memories 110(0)-110(*p*) may be double data rate (DDR), low power double data rate (LPDDR), graphics double data rate (GDDR), or other DRAM in some embodiments of the disclosure. The memories 110(0)-110(*p*) are each coupled to command/address, data, and clock busses. The controller 10 and the memory system 105 are in communication over several busses. Commands and addresses CA are received by the memory system 105 on a command/address bus 115, and data DQ is provided between the controller 10 and the memory system 105 over a data bus 125. Various clocks may be provided between the controller and memory system 105 over a clock bus 130. The clock bus 130 may include signal lines for providing system clocks CK_t and CK_c received by the memory system 105 and data clocks (strobes) DQS_t and DQS_c received and/or provided by the memory system 105 to the controller 10. Each of the busses may include one or more signal lines on which signals are provided.

The CK_t and CK_c clocks provided by the controller 10 to the memory system 105 are used for timing the provision and receipt of the commands and addresses. The DQS_t and DQS_c clocks are used for timing the provision of data. The CK_t and CK_c clocks are complementary, and the DQS_t and DQS_c clocks are complementary. Clocks are complementary when a rising edge of a first clock occurs at a same time as a falling edge of a second clock, and when a rising edge of the second clock occurs at a same time as a falling edge of the first clock.

The controller 10 provides commands to the memory system 105 to perform memory operations. Examples of memory commands include timing commands for controlling the timing of various operations, access commands for accessing the memory, such as read commands for performing read operations and write commands for performing write operations, mode register write and read commands for performing mode register write and read operations, as well as other commands and operations. The command signals provided by the controller 10 to the memory system 105 further include external control signals (e.g., CS_n(0), CS_n(1), CS_n(p)). While all of the memories 110(0)-110(*p*) are provided the commands, addresses, data, and clocks, the external control signals provided on respective select signal lines are used to select which of the memories 110(0)-110(*p*) will respond to the command and perform the corresponding operation. In some embodiments of the disclosure, a respective control signal is provided to each memory 110(0)-110(*p*) of the memory system 105. The controller 10 provides an active control signal to select the corresponding memory

110(0)-110(*p*). While the respective control signal is active, the corresponding memory 110(0)-110(*p*) is selected to receive the commands and addresses provided on the command/address bus 115. In some embodiments of the disclosure, the external control signal is used in combination with the CA signals to indicate different memory commands and memory operations.

In operation, when a read command and associated address are provided by the controller 10 to the memory system 105, the memory 110(0)-110(*p*) selected by the external control signals receives the read command and associated address and performs a read operation to provide the controller 10 with read data from a memory location corresponding to the associated address. The read data is provided by the selected memory 110(0)-110(*p*) to the controller 10 according to a timing relative to receipt of the read command. For example, the timing may be based on a read latency (RL) value that indicates the number of clock cycles of the CK_t and CK_c clocks (a clock cycle of the CK_t and CK_c clocks is referenced as tCK) after the read command when the read data is provided by the selected memory 110(0)-110(*p*) to the controller 10. The RL value is programmed by the controller 10 in the memories 110(0)-110(*p*). For example, the RL value may be programmed in respective mode registers of the memories 110(0)-110(*p*). As known, mode registers included in each of the memories 110(0)-110(*p*) may be programmed with information for setting various operating modes and/or to select features for operation of the memories. One of the settings may be for the RL value.

In preparation of the selected memory 110(0)-110(*p*) providing the read data to the controller 10, the memory 110(0)-110(*p*) provides active data clocks DQS_t and DQS_c. A clock is active when the clock transitions between low and high clock levels periodically. Conversely, a clock is inactive when the clock maintains a constant clock level and does not transition periodically. The DQS_t and DQS_c clocks are provided by the memory 110(0)-110(*p*) performing the read operation to the controller 10 for timing the provision of read data to the controller 10. The controller 10 may use the DQS_t and DQS_c clocks for receiving the read data.

In operation, when a write command and associated address are provided by the controller 10 to the memory system 105, the memory 110(0)-110(*p*) selected by the external control signals receives the write command and associated address and performs a write operation to write data from the controller 10 to a memory location corresponding to the associated address. The write data is provided to the selected memory 110(0)-110(*p*) by the controller 10 according to a timing relative to receipt of the write command. For example, the timing may be based on a write latency (WL) value that indicates the number of clock cycles of the CK_t and CK_c clocks after the write command when the write data is provided to the selected memory 110(0)-110(*p*) by the controller 10. The WL value is programmed by the controller 10 in the memories 110(0)-110(*p*). For example, the WL value may be programmed in respective mode registers of the memories 110(0)-110(*p*).

In preparation of the selected memory 110(0)-110(*p*) receiving the write data from the controller 10, the controller 10 provides active data clocks DQS_t and DQS_c to the memory system 105. The DQS_t and DQS_c clocks may be used by the selected memory 110(0)-110(*p*) to generate internal clocks for timing the operation of circuits to receive the write data. The data is provided by the controller 10 and the selected memory 110(0)-110(*p*) receives the write data according to the DQS_t and DQS_c clocks, which is written to memory corresponding to the memory addresses.

Figure 2:
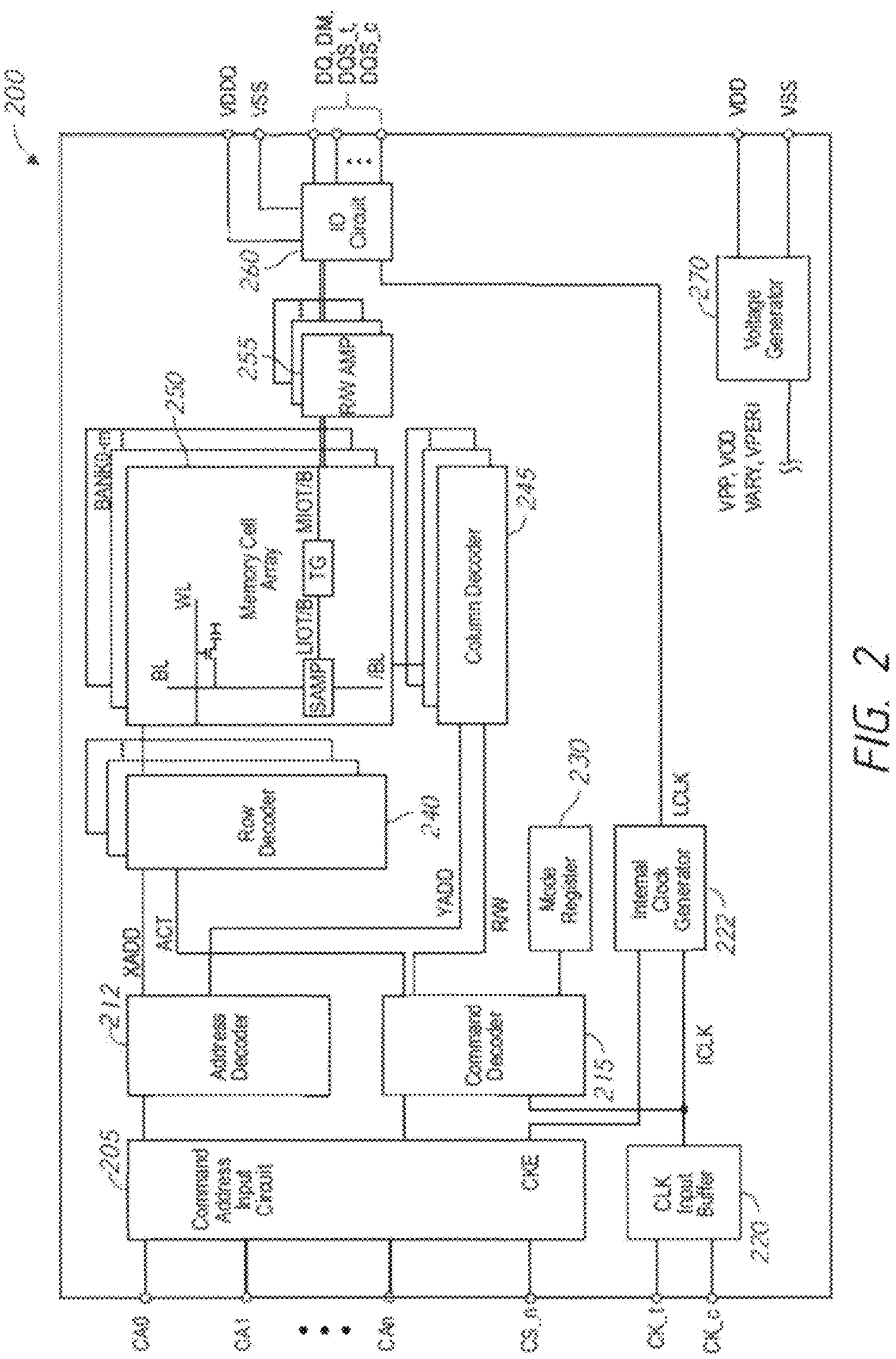
FIG. 2 illustrates a block diagram of a semiconductor device according to an embodiment of the disclosure.

Mode register write commands and mode register read commands can be used to access the mode registers (e.g., mode register 230 in FIG. 2). In operation, when a mode register read command and associated address are provided by the controller 10 to the memory system 105, the mode register selected by the select signals receives the read command and associated address and performs a read operation to provide the controller 10 with read data from the mode register corresponding to the associated address. The read data is provided by the selected mode register to the controller 10. When a mode register write command and associated address are provided by the controller 10 to the memory system 105, the mode register selected by the select signals receives the write command and associated address and performs a write operation to write data from the controller 10 to a mode register corresponding to the associated address. The write data is provided to the selected mode register by the controller 10.

FIG. 2 illustrates a block diagram of a semiconductor device 200 according to an embodiment of the disclosure. The semiconductor device 200 may include, without limitation, a DRAM. The semiconductor device 200 includes a memory array 250. The memory array 250 is shown as including a plurality of memory banks. In the embodiment of FIG. 2, the memory array 250 is shown as including memory banks BANK0-BANKm. Each memory bank includes a plurality of word lines WL, a plurality of bit lines BL and/BL, and a plurality of memory cells MC arranged at intersections of the plurality of word lines WL and the plurality of bit lines BL and/BL. Selection of the word line WL is performed by a row decoder 240 and selection of the bit lines BL and/BL is performed by a column decoder 245. In the embodiment of FIG. 2, the row decoder 240 includes a respective row decoder for each memory bank and the column decoder 245 includes a respective column decoder for each memory bank. The bit lines BL and/BL are coupled to a respective sense amplifier (SAMP). Read data from the bit line BL or/BL is amplified by the sense amplifier SAMP and transferred to read/write amplifiers 255 over complementary local data lines (LIOT/B), transfer gate (TG), and complementary main data lines (MIOT/B). Conversely, write data outputted from the read/write amplifiers 255 is transferred to the sense amplifier SAMP over the complementary main data lines MIOT/B, the transfer gate TG, and the complementary local data lines LIOT/B, and written in the memory cell MC coupled to the bit line BL or/BL.

A mode register 230 stores information, for example, configuration and status information for the semiconductor device 200. The mode register 230 may be accessed through mode register read commands and mode register write commands. The mode register access commands cause the semiconductor device 200 to perform mode register read operations and mode register write operations. A mode register read command causes the semiconductor device 200 to provide information stored by the mode register that is accessed, and a mode register write command causes the semiconductor device 200 to store information in the mode register that is accessed. The mode register 230 may include several mode registers, with each of the mode registers corresponding to a mode register address and storing different types of information. In some embodiments of the disclosure, one or more mode registers may be grouped into a mode register page (MRP). The group of mode registers can be grouped by the types of information stored, such as storing information having similar characteristics, such as information related to modes of operation, input/output related configuration settings, various calibration settings, as well as others.

The semiconductor device 200 may employ a plurality of external terminals that include command and address and control terminals (CA0-CAn and CS_n) coupled to a command and address bus to receive commands and addresses, and an external control CS_n signal. The external terminals may further include clock terminals to receive clocks CK_t and CK_c, and data clocks DQS_t and DQS_c, data terminals DQ and DM, and power supply terminals to receive power supply potentials VDD, VSS, and VDDQ.

The clock terminals are supplied with external clocks CK_t and CK_c that are provided to an input buffer 220. The external clocks may be complementary. The input buffer 220 generates an internal clock ICLK based on the CK_t and CK_c clocks. The ICLK clock is provided to the command decoder 215 and to an internal clock generator 222. The internal clock generator 222 provides various internal clocks LCLK based on the ICLK clock. The LCLK clocks may be used for timing operations of various internal circuits.

The CA terminals (e.g., CA0-CAn) may be supplied with memory addresses. The memory addresses supplied to the CA terminals are transferred, via a command/address input circuit 205, to an address decoder 212. The address decoder 212 receives the address and supplies a decoded row address XADD to the row decoder 240 and supplies a decoded column address YADD to the column decoder 245. The CA terminals may be supplied with commands. Examples of commands include access commands for accessing the memory, such as read commands for performing read operations and write commands for performing write operations, mode register write and read commands for performing mode register write and read operations, as well as other commands and operations.

The commands may be provided as internal command signals to a command decoder 215 via the command/address input circuit 205. The command decoder 215 includes circuits to decode the internal command signals to generate various internal signals and commands for performing operations. For example, the command decoder 215 may provide a row command signal ACT to select a word line and a column command signal R/W to select a bit line.

The power supply terminals are supplied with power supply potentials VDD and VSS. The power supply potentials VDD and VSS are supplied to an internal voltage generator circuit 270. The internal voltage generator circuit 270 generates various internal potentials VPP, VOD, VARY, VPERI, and the like based on the power supply potentials VDD and VSS supplied to the power supply terminals. The internal potential VPP is mainly used in the row decoder 240, the internal potentials VOD and VARY are mainly used in the sense amplifiers SAMP included in the memory array 250, and the internal potential VPERI is used in many peripheral circuit blocks.

The power supply terminals are also supplied with power supply potentials VDDQ and VSS. The power supply potentials VDDQ and VSS are supplied to the input/output circuit 260. The power supply potentials VDDQ and VSS supplied to the power supply terminals may be the same potentials as the power supply potentials VDD and VSS supplied to the power supply terminals in an embodiment of the disclosure. The power supply potentials VDDQ and VSS supplied to the power supply terminals may be different potentials from the power supply potentials VDD and VSS supplied to the power supply terminals in another embodiment of the disclosure. The power supply potentials VDDQ and VSS supplied to the power supply terminals are used for the input/output circuit 260 so that power supply noise generated by the input/output circuit 260 does not propagate to the other circuit blocks.

When a read command is received, and a row address and a column address are timely supplied with the read command, read data is read from memory cells in the memory array 250 corresponding to the row address and column address. The read command is received by the command decoder 215, which provides internal commands so that read data from the memory array 250 is provided to the read/write amplifiers 255. The read data is output to outside from the data terminals DQ via the input/output circuit 260. The DQS_t and DQS_c clocks are provided externally from clock terminals for timing provision of the read data by the input/output circuit 260. The external terminals DQ include several separate terminals, each providing a bit of data synchronized with a clock edge of the DQS_t and DQS_c clocks.

When a write command is received, and a row address and a column address are timely supplied with the write command, write data supplied to the data terminals DQ is written to a memory cells in the memory array 250 corresponding to the row address and column address. A data mask may be provided to the data terminals DM to mask portions of the data when written to memory. The write command is received by the command decoder 215, which provides internal commands so that the write data is received by input receivers in the input/output circuit 260. DQS_t and DQS_c clocks are also provided to the external clock terminals (e.g., by a controller) for timing the receipt of the write data by the input receivers of the input/output circuit 260. The write data is supplied via the input/output circuit 260 to the read/write amplifiers 255, and by the read/write amplifiers 255 to the memory array 250 to be written into a memory cell MC. As previously described, the external terminals DQ include several separate terminals. With reference to a write operation, each external terminal DQ concurrently receives a bit of data synchronized with a clock edge of the DQS_t and DQS_c clocks.

When a mode register read command is received, and a mode register address is timely supplied with the mode register read command, read data is read from the mode register 230 corresponding to the mode register address. The read data is output to outside from the data terminals DQ via the input/output circuit 260. When a mode register write command is received, and a mode register address is timely supplied with the mode register write command, write data supplied to the data terminals DQ is written to the mode register 230 corresponding to the mode register address.

Figure 3:
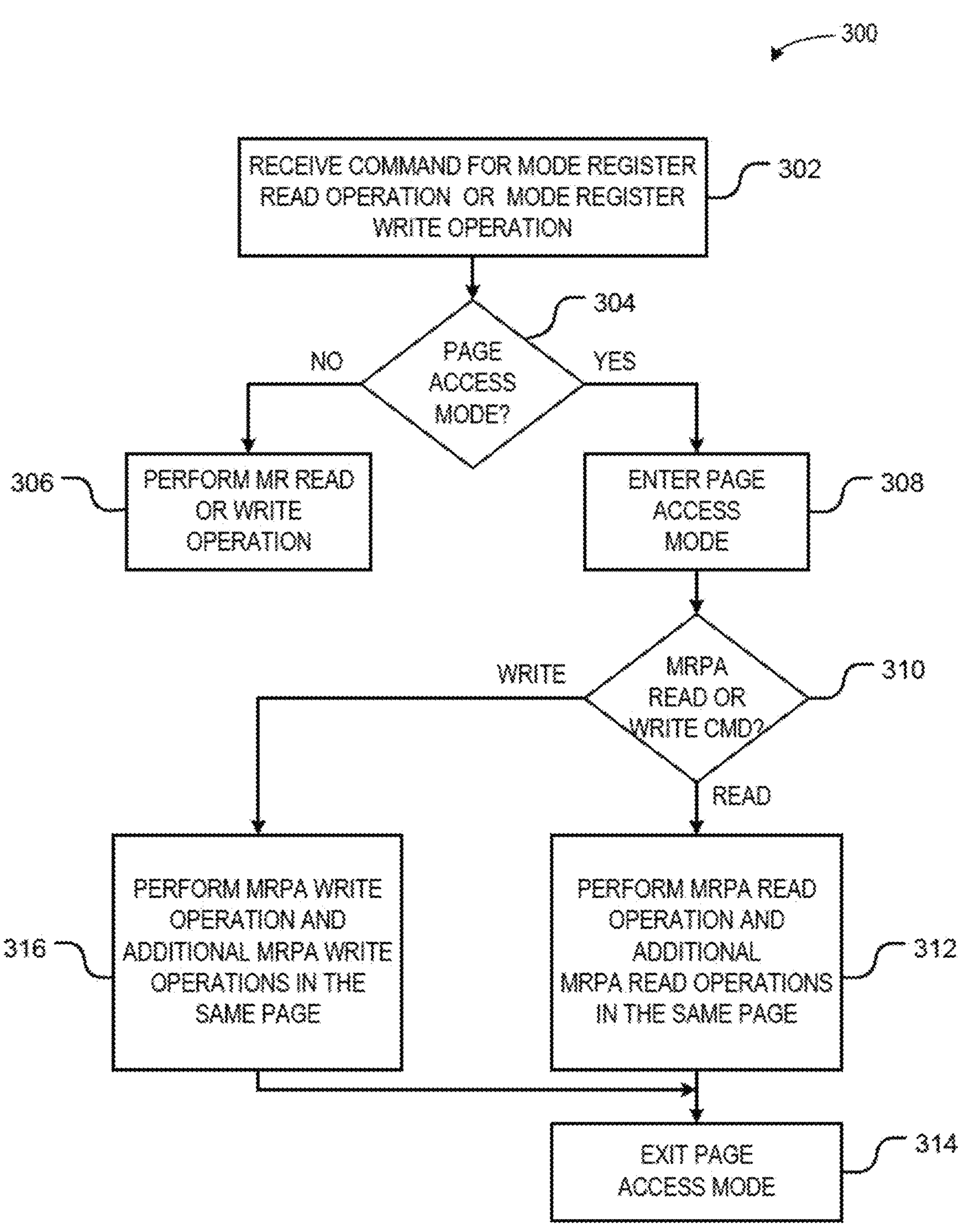
FIG. 3 illustrates a flowchart of an example method of operating a semiconductor device according to an embodiment of the disclosure.

FIG. 3 illustrates a flowchart of an example method 300 of operating a semiconductor device according to an embodiment of the disclosure. In some embodiments of the disclosure, the method may be performed by the semiconductor device 200 of FIG. 2 and/or the memories 110(0)-**110(*p*) of FIG. 1**.

At block 302, a command to perform a mode register read operation or a mode register write operation is received. A determination is made at block 304 as to whether a mode register read command associated with the mode register read operation, or a mode register write command associated with the mode register write operation, causes the semiconductor device (e.g., causes one or more mode registers in the semiconductor device) to enter an MRPA mode. In some embodiments of the disclosure, the MRPA mode refers to the execution or the performance of multiple MRPA write operations to the same page or MRPA read operations from the same page. Non-limiting nonexclusive command truth tables for mode register page access (MRPA) read commands and MRPA write commands associated with the MRPA mode are described in more detail in conjunction with FIG. 4 and FIG. 5.

If a determination is made at block 304 that the mode register read command or the mode register write command does not cause the semiconductor device (e.g., cause one or more mode registers in the semiconductor device) to enter the MRPA mode, the method passes to block 306 where a mode register read operation defined by the mode register read command or a mode register write operation defined by the mode register write command is performed. The mode register read command and the mode register write command are direct mode register access commands. With direct mode register access commands, a mode register corresponding to the mode register address is accessed once. For subsequent mode register read operations, the full mode register read command is received for each mode register read operation (e.g., the command, the mode register page address, and the mode register address). For subsequent mode register write operations, the full mode register write command is received for each mode register write operation (e.g., the command, the mode register page address, the mode register address, and the OP code to be written to the mode register). Non-limiting nonexclusive command truth tables for direct mode register read commands and direct mode register write commands are described in more detail in conjunction with FIG. 4 and FIG. 5.

When a determination is made at block 304 that the mode register read command or the mode register write command will cause the semiconductor device (e.g., cause one or more mode registers in the semiconductor device) to enter the MRPA mode, the method continues at block 308 where the semiconductor device enters the MRPA mode. The mode register read command and the mode register write command that cause the semiconductor device to enter the MRPA mode are MRPA commands. With MRPA commands, a mode register page corresponding to a mode register page address is identified and is available for multiple accesses to that mode register page. For example, an MRPA write command causes a write operation associated with the MRPA write command to be performed and enables subsequent write operations to be performed on the same mode register page until the semiconductor device exits the MRPA mode (or until the last MRPA write command is received). An MRPA read command causes a read operation associated with the MRPA read command to be performed and enables subsequent read operations to be performed on the same mode register page until the semiconductor device exits the MRPA mode (or until the last MRPA read command is received).

Various techniques can be used to cause the semiconductor device to enter the MRPA mode. In one embodiment, an external control signal can toggle to a particular state in the MRPA read command or in the MRPA write command. In one embodiment, the external control signal is a CS signal. For example, the external control signal may toggle to a low state for one clock cycle (e.g., a system clock provided to a semiconductor device) to enter the MRPA mode. A non-limiting nonexclusive example of the use of the external control signal to cause the semiconductor device to enter the MRPA mode is described in more detail in conjunction with FIGS. 4-6A.

In another embodiment, one or more command address (CA) bits can be set to a particular state in the MRPA read command or in the MRPA write command to cause the semiconductor device to enter the MRPA mode. For example, the last CA bit in the sequence of CA bits may be set to a low state to cause the semiconductor device to enter the MRPA mode. A non-limiting nonexclusive example of the use of the CA bits to cause the semiconductor device to enter the MRPA mode is described in more detail in conjunction with FIG. 6D.

In yet another embodiment, some or all of the mode register address (MRA) bits can be set at a particular state or a particular sequence of states in the mode register page access read command or in the mode register page access write command to cause the semiconductor device to enter the MRPA mode. For example, in an embodiment when there are six MRA bits, all of the six MRA bits may be set to a low state to cause the semiconductor device to enter the MRPA mode. A non-limiting nonexclusive example of the use of the MRA bits to cause the semiconductor device to enter the MRPA mode is described in more detail in conjunction with FIG. 6C.

Next, as shown in block 310, a determination is made as to whether an MRPA read command or an MRPA write command was received at block 302. If a determination is made that an MRPA read command was received, the method proceeds at block 312 where the MRPA read operation is performed in the mode register page corresponding to the MRP of the MRPA read command, and in the mode register corresponding to the MRA of the MRPA read command. Additional mode registers in the same MRP are read in the MRPA mode when one or more additional MRPA read commands including another MRA are received, causing one or more corresponding additional read operations to be performed in the same MRP. Generally, an MRPA read command causes the semiconductor device to enter the MRPA mode and establishes the MRP and a first mode register of the MRP to be accessed. Each subsequent MRPA read command includes an MRA in the same MRP to be read. Additional MRPA read operations for mode registers in the same MRP continue until the semiconductor device exits the MRPA mode at block 314.

Returning to block 310, when a determination is made that an MRPA write command was received, the method passes to block 316. At block 316, the MRPA write operation is performed in a mode register page corresponding to the MRP of the MRPA write command, and in the mode register corresponding to the MRA of the MRPA write command. Additional mode registers in the same MRP are programmed in the MRPA mode when one or more additional MRPA write commands including another MRA are received, causing one or more additional write operations to be performed in the same MRP. Generally, an MRPA write command causes the semiconductor device to enter the MRPA mode and establishes the MRP and a first mode register of the MRP to be accessed. Each subsequent MRPA write command includes an MRA to be written to in the same MRP and the OP code for the mode register write operation. Additional MRPA write operations for mode registers in the same MRP continue until the semiconductor device exits the MRPA mode at block 314.

Various techniques may be used to cause the semiconductor device (e.g., cause one or more mode registers in the semiconductor device) to exit the MRPA mode. In one embodiment, the external control signal can toggle to a particular state in the MRPA read command or in the MRPA write command for multiple consecutive clock cycles (e.g., consecutive rising edges or falling edges). For example, the external control signal may toggle to a low state for two consecutive clock cycles to cause the semiconductor device to exit the MRPA mode. A non-limiting nonexclusive example of toggling the state of the external control signal is described in more detail in conjunction with FIG. 6B.

In another embodiment, one or more CA bits in the MRPA read command or in the MRPA write command can be set to a particular state to cause the semiconductor device to exit the MRPA mode. For example, the last CA bit in the sequence of CA bits may be set to a low state to cause the semiconductor device (e.g., cause one or more mode registers in the semiconductor device) to exit the MRPA mode. A non-limiting nonexclusive example of the use of the one or more CA bits to exit the MRPA mode is described in more detail in conjunction with FIGS. 4, 5, and 6D.

In yet another embodiment, some or all of the MRA bits can be set at a particular state or to a particular sequence of states in the MRPA read command or in the MRPA write command. For example, in an embodiment when there are six MRA bits, all of the six mode register bits may be set to a low state to cause the mode register to exit the MRPA mode. A non-limiting nonexclusive example of the use of the mode register address bits to cause the semiconductor device (e.g., cause one or more mode registers in the semiconductor device) to exit the MRPA mode is described in more detail in conjunction with FIG. 6C.

FIG. 4 illustrates a first example of a command truth table 400 according to an embodiment of the disclosure. The example command truth table 400 includes an example configuration for a 7-bit CA bus. Although the illustrated command truth table 400 depicts low (L), high (H), and valid (V) states in some fields, other embodiments are not limited to these states or to the illustrated sequence of states. Additionally, or alternatively, a command may or may not include command bits (e.g., see the MRPA write extension same page command 412 in FIGS. 4 and 512 in FIG. 5). In some embodiments, the command truth table 400 may be implemented with the semiconductor device 200 of FIG. 2 and/or the memories 110(0)-110(*p*) of FIG. 1. In some embodiments, the command truth table 400 may be implemented with the method 300 of FIG. 3.

The command truth table 400 includes column entries for a command (Function) 402, the external control signal (CS_n) 404, and the CA bits (CA0-CA6) 406. The example command truth table 400 includes row entries for each command 402. The commands 402 include a mode register write command 408, an MRPA write same page command 410, an MRPA write extension same page command 412, a mode register read command 414, an MRPA read same page command 416, and an MRPA read extension same page command 418.

The mode register write command 408 is a 4-cycle command in which each sub-row 420, 422, 424, 426 is received at one clock cycle (for a total of four clock cycles for the entire command). The mode register write command 408 is an example of a write command that is performed at block 306 in FIG. 3. The MRPA write same page command 410 is a 4-cycle command in which each sub-row 428, 430, 432, 434 is received at one clock cycle (for a total of four clock cycles for the entire command). The MRPA write extension same page command 412 is a 2-cycle command in which each sub-row 436, 438 is received at one clock cycle (for a total of two clock cycles for the entire command). The MRPA write same page command 410 and the MRPA write extension same page command 412 are example write commands that are performed at block 316 in FIG. 3.

The mode register read command 414 is a 3-cycle command in which each sub-row 440, 442, 444 is received at one clock cycle (for a total of three clock cycles for the entire command). The mode register read command 414 is an example read command that is performed at block 306 in FIG. 3. The MRPA read same page command 416 is a 3-cycle command in which each sub-row 446, 448, 450 is received at one clock cycle (for a total of three clock cycles for the entire command). The MRPA read extension same page command 418 is a 1-cycle command in which the sub-row 452 is received at one clock cycle. The MRPA read same page command 416 and the MRPA read extension same page command 418 are example read commands that are performed at block 312 in FIG. 3.

The mode register write command 408 can be used for standalone mode register write operations (e.g., when the semiconductor device is not in the MRPA mode). The mode register write command 408 is an example of a direct mode register command. The sequence of the states (H or L) in the CA0-CA4 bits in sub-row 420 define the command to be performed, which is the mode register write command 408. The sequence of the states in MRP0-MRP4 in the CA0-CA4 bits in sub-row 422 identify the MRP to be accessed. The sequence of the states in MRA0-MRA5 in the CA0-CA5 bits in sub-row 424 define the MRA in the MRP to be accessed. The state in OP0 in the CA6 bit in sub-row 424 along with the sequence of the states in OP1-OP7 in the CA0-CA6 bits in sub-row 426 provide the OP code for the write operation.

The MRPA write same page command 410 can be used to cause the semiconductor device (e.g., cause one or more mode registers in the semiconductor device) to enter the MRPA mode. In the illustrated embodiment, the external control signal 404 is used to cause the semiconductor device to enter the MRPA mode. The external control signal 404 toggles, or is set to, a low state in sub-row 432 (compared to the state of the external control signal 404 in sub-row 424), which indicates the semiconductor device is to enter the MRPA mode. This technique is shown and described in more detail in conjunction with FIG. 6A. Other techniques for causing the semiconductor device (e.g., causing one or more mode registers in the semiconductor device) to enter the MRPA mode are described in more detail in conjunction with FIGS. 6C-6D.

In the MRPA write same page command 410, the sequence of the states (H or L) in the CA0-CA4 bits in sub-row 428 define the command to be performed, which is the MRPA write same page command 410. The sequence of the states in MRP0-MRP4 in the CA0-CA4 bits in sub-row 430 provide the MRP address to be accessed. The sequence of the states in MRA0-MRA5 in the CA0-CA5 bits in sub-row 432 define the MRA in the MRP to be accessed. The state in OP0 in the CA6 bit in sub-row 432 along with the sequence of the states in OP1-OP7 in the CA0-CA6 bits in sub-row 434, respectively, provide the OP code for the write operation.

When one or more additional MRPA write operations are performed on the same MRP, the MRPA write extension same page command 412 is used to cause the semiconductor device (e.g., cause one or more mode registers in the semiconductor device) to remain in the MRPA mode and perform an additional MRPA write operation on the same page. The MRPA write extension same page command 412 is received for each additional MRPA write operation to be performed. In the example embodiment, the external control signal 404 toggles, or is set to, a low state in sub-row 436, which indicates the semiconductor device is to remain in the MRPA mode. The sequence of the states in MRA0-MRA5 in the CA0-CA5 bits in sub-row 436 define the MRA to be accessed. The state in OP0 in the CA6 bit in sub-row 436 along with the sequence of the states in OP1-OP7 in the CA0-CA6 bits in sub-row 438, respectively, provide the OP code for the MRPA write operation. Thus, one advantage to the MRPA mode is that the command and the MRP address are not included in the MRPA write extension same page command 412. The mode register address and the OP code are included in the MRPA write extension same page command 412. This eliminates two cycles from each additional MRPA write operation that is performed with the MRPA write extension same page command 412.

With respect to read operations, the mode register read command 414 can be used for standalone read operations (e.g., when the semiconductor device is not in the MRPA mode). The mode register read command 414 is an example of a direct mode register command. The sequence of the states (H or L) in the CA0-CA4 bits in sub-row 440 define the command to be performed, which is the mode register read command 414. The sequence of the states in MRP0-MRP4 in the CA0-CA4 bits in sub-row 442 provide the MRP to be accessed. The sequence of the states in MRA0-MRA5 in the CA0-CA5 bits in sub-row 444 define the MRA in the MRP to be accessed.

The MRPA read same page command 416 can be used to cause the semiconductor device to enter the MRPA mode. In the illustrated embodiment, the external control signal 404 is used to cause the semiconductor device (e.g., cause one or more mode registers in the semiconductor device) to enter the MRPA mode. The external control signal 404 toggles, or is set to, a low state in sub-row 450 (compared to the state of the external control signal 404 in sub-row 444). The low state in sub-row 450 indicates the semiconductor device is to enter the MRPA mode. Other techniques for causing the semiconductor device to enter the MRPA mode are described in more detail in conjunction with FIGS. 6C-6D.

In the MRPA read same page command 416, the sequence of the states (H or L) in the CA0-CA4 bits in sub-row 446 define the command to be performed, which is the MRPA read same page command 416. The sequence of the states in MRP0-MRP4 in the CA0-CA4 bits in sub-row 448 provides the MRP address to be accessed. The sequence of the states in MRA0-MRA5 in the CA0-CA5 bits in sub-row 450 define the MRA in the MRP to be accessed.

When one or more additional MRPA read operations are performed on the same page, the MRPA read extension same page command 418 is used to cause the semiconductor device to remain in the MRPA mode and perform an additional MRPA read operation on the same MRP. The MRPA read extension same page command 418 is received for each additional MRPA read operation to be performed while in the MRPA mode. In the example embodiment, the external control signal 404 toggles, or is set to, a low state in sub-row 452, which indicates the semiconductor device is to remain in the MRPA mode. The sequence of the states in MRA0-MRA5 in the CA0-CA5 bits in sub-row 452 identify the MRA in the same MRP to be accessed. Thus, another advantage to the MRPA mode is that the command and the MRP address are not included in the MRPA read extension same page command 418. The MRA is included in the MRPA read extension same page command 418. This eliminates one cycle from each additional read operation that is performed with the MRPA read extension same page command 418.

The command truth table 400 depicts one technique that can be used to exit the MRPA mode. In the MRPA read same page command 416 and in the MRPA read extension same page command 418, the state of the CA6 bit can be set to a state that indicates the semiconductor device is to exit the MRPA mode (see highlighted area 454). This example technique is shown and described in more detail in conjunction with FIG. 6D. In a non-limiting nonexclusive example, the state is a low state, although other embodiments are not limited to this state. Other techniques that may be used to exit the MRPA mode are described in more detail in conjunction with FIG. 6B and FIG. 6C.

Figure 5:
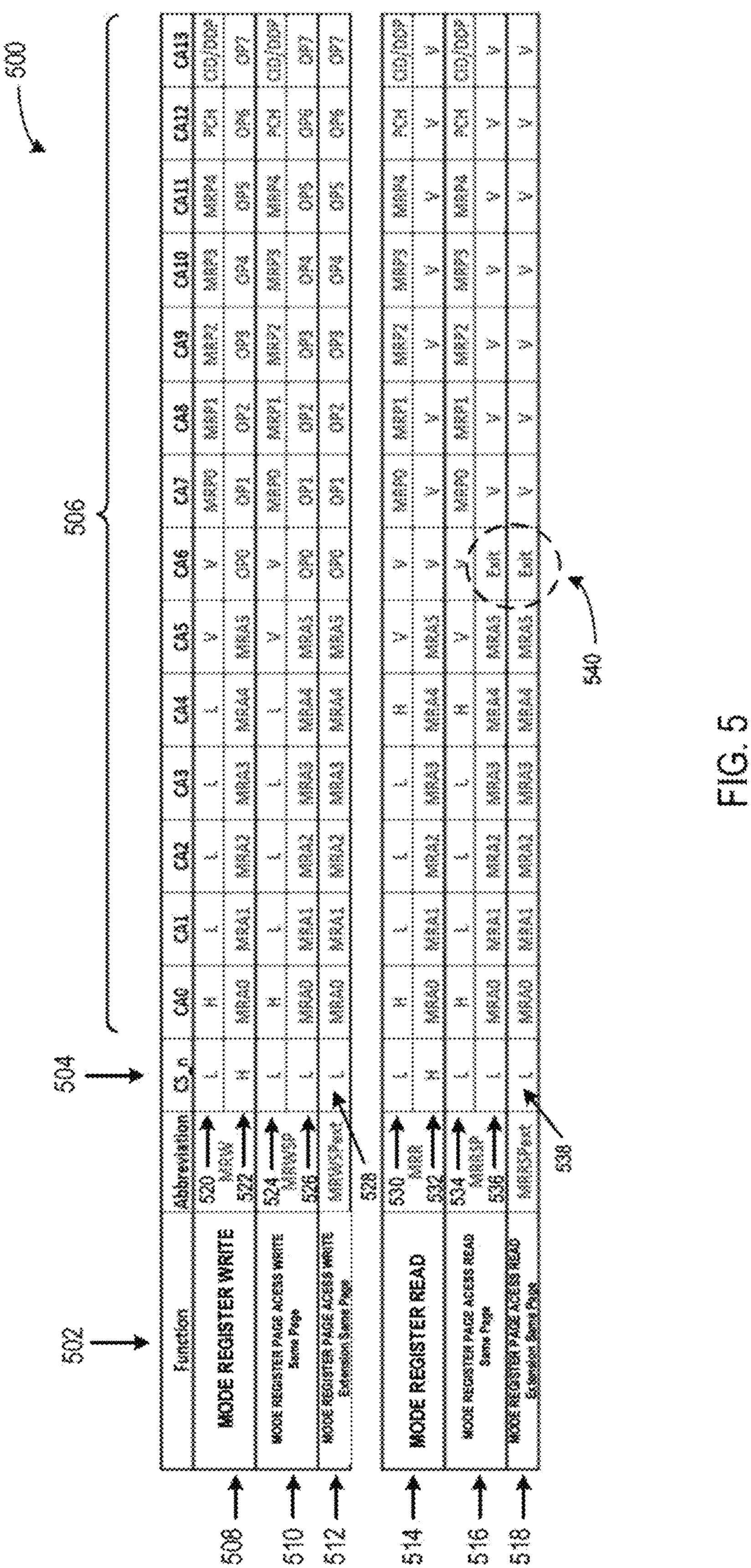
FIG. 5 illustrates a second example of a command truth table according to an embodiment of the disclosure.

FIG. 5 illustrates a second example of a command truth table 500 according to an embodiment of the disclosure. The example command truth table 500 includes an example configuration for a 14-bit CA bus. Although the illustrated command truth table 500 depicts L, H, and V states in some fields, other embodiments are not limited to these states or to the illustrated sequence of states. In some embodiments, the command truth table 500 may be implemented with the semiconductor device 200 of FIG. 2 and/or the memories 110(0)-110(*p*) of FIG. 1. In some embodiments, the command truth table 500 may be implemented with the method 300 of FIG. 3.

The command truth table 500 includes column entries for a command (Function) 502, the external control signal (CS_n) 504, and the CA bits (CA0-CA13) 506. The example command truth table 500 includes row entries for each command 502. The commands 502 include a mode register write command 508, an MRPA write same page command 510, an MRPA write extension same page command 512, a mode register read command 514, an MRPA read same page command 516, and an MRPA read extension same page command 518.

The mode register write command 508 is a 2-cycle command in which each sub-row 520, 522 is received at one clock cycle (for a total of two clock cycles for the entire command). The mode register write command 508 is an example mode register write command that is performed at block 306 in FIG. 3. The MRPA write same page command 510 is a 2-cycle command in which each sub-row 524, 526 is received at one clock cycle (for a total of two clock cycles for the entire command). The MRPA write extension same page command 512 is a 1-cycle command in which the sub-row 528 is received at one clock cycle. The MRPA write same page command 510 and the MRPA write extension same page command 512 are example MRPA write commands that are performed at block 316 in FIG. 3.

The mode register read command 514 is a 2-cycle command in which each sub-row 530, 532 is received at one clock cycle (for a total of two clock cycles for the entire command). The mode register read command 514 is an example mode register read command that is performed at block 306 in FIG. 3. The MRPA read same page command 516 is a 2-cycle command in which each sub-row 534, 536 is received at one clock cycle (for a total of two clock cycles for the entire command). The MRPA read extension same page command 518 is a 1-cycle command in which the sub-row 538 is received at one clock cycle. The MRPA read same page command 516 and the MRPA read extension same page command 518 are example MRPA read commands that are performed at block 312 in FIG. 3.

The mode register write command 508 can be used for standalone write operations (e.g., when the semiconductor device is not in the MRPA mode). The mode register write command 508 is an example of a direct mode register command. The sequence of the states (H or L) in the CA0-CA4 bits in sub-row 520 define the command to be performed, which is the mode register write command 508. The sequence of the states in MRP0-MRP4 in the CA7-CA11 bits in sub-row 520 provide the MRP address to be accessed. The sequence of the states in MRA0-MRA5 in the CA0-CA5 bits in sub-row 522 identify the MRA in the MRP to be accessed. The sequence of the states in OP0-OP7 in the CA6-CA13 bits in sub-row 522 provide the OP code for the write operation.

The MRPA write same page command 510 can be used to cause the semiconductor device (e.g., cause one or more mode registers in the semiconductor device) to enter the MRPA mode. In the illustrated embodiment, the external control signal 504 is used to cause the semiconductor device to enter the MRPA mode. The external control signal 504 toggles, or is set to, a low state in sub-row 526 (compared to the state of the external control signal in sub-row 522), which indicates the semiconductor device is to enter the MRPA mode. This technique is shown and described in more detail in conjunction with FIG. 6A. Other techniques for causing the semiconductor device to enter the MRPA mode are described in more detail in conjunction with FIGS. 6C-6D.

In the MRPA write same page command 510, the sequence of the states (H or L) in the CA0-CA4 bits in sub-row 524 define the command to be performed, which is the MRPA write same page command 510. The sequence of the states in MRP0-MRP4 in the CA7-CA11 bits in sub-row 524 provide the MRP address to be accessed. The sequence of the states in MRA0-MRA5 in the CA0-CA5 bits in sub-row 526 define the MRA in the MRP to be accessed. The sequence of the states in OP0-OP7 in the CA6-CA13 bits in sub-row 526 provide the OP code for the write operation.

When one or more additional MRPA write operations are performed on the same MRP, the MRPA write extension same page command 512 is used to cause the semiconductor device (e.g., cause one or more mode registers in the semiconductor device) to remain in the MRPA mode and perform an additional MRPA write operation on the same page. The MRPA write extension same page command 512 is received for each additional MRPA write operation to be performed while in the MRPA mode. In the example embodiment, the external control signal 504 toggles, or is set to, a low state in sub-row 528, which indicates the semiconductor device is to remain in the MRPA mode. The sequence of the states in MRA0-MRA5 in the CA0-CA5 bits in sub-row 528 identify the MRA to be accessed. The sequence of the states in OP0-OP7 in the CA6-CA13 bits in sub-row 528 provide the OP code for the MRPA write operation. Thus, another advantage to the MRPA mode is that the command and the MRP address are not included in the MRPA write extension same page command 512. The MRA and the OP code are included in the MRPA write extension same page command 512. This eliminates one cycle from each additional MRPA write operation that is performed using the MRPA write extension same page command 512.

With respect to read operations, the mode register read command 514 can be used for standalone read operations (e.g., when the semiconductor device is not in the mode register page access mode). The mode register read command 514 is an example of a direct mode register access command. The sequence of the states (H or L) in the CA0-CA4 bits in sub-row 530 define the command to be performed, which is the mode register read command 514. The sequence of the states in MRP0-MRP4 in the CA7-CA11 bits in sub-row 530 provide the MRP address to be accessed. The sequence of the states in MRA0-MRA5 in the CA0-CA5 bits in sub-row 532 define the MRA in the MRP to be accessed.

The MRPA read same page command 516 can be used to cause the semiconductor device (e.g., cause one or more mode registers in the semiconductor device) to enter the MRPA mode. In the illustrated embodiment, the external control signal 504 is used to cause the semiconductor device to enter the MRPA mode. The external control signal 504 toggles, or is set to, a low state in sub-row 536 (compared to the state of the external control signal 504 in sub-row 532). The low state for the external control signal 504 in the sub-row 536 indicates the semiconductor device is to enter the MRPA mode. Other techniques for causing the semiconductor device to enter the MRPA mode are described in more detail in conjunction with FIGS. 6C-6D.

In the MRPA read same page command 516, the sequence of the states (H or L) in the CA0-CA4 bits in sub-row 534 define the command to be performed, which is the MRPA read same page command 516. The sequence of the states in MRP0-MRP4 in the CA7-CA11 bits in sub-row 534 provide the MRP address to be accessed. The sequence of the states in MRA0-MRA5 in the CA0-CA5 bits in sub-row 536 define the MRA in the MRP to be accessed.

When one or more additional MRPA read operations are to be performed on the same page, the MRPA read extension same page command 518 is used to cause the semiconductor device (e.g., cause one or more mode registers in the semiconductor device) to remain in the MRPA mode and perform an additional MRPA read operation on the same page. The MRPA read extension same page command 518 is received for each additional read operation to be performed. In the example embodiment, the external control signal 504 toggles, or is set to, a low state in sub-row 538, which indicates the semiconductor device is to remain in the MRPA mode. The sequence of the states in MRA0-MRA5 in the CA0-CA5 bits in sub-row 538 define the MRA in the MRP to be accessed. Thus, another advantage to the MRPA mode is that the command and the MRP address are not included in the MRPA read extension same page command 518. The MRA is included in the MRPA read extension same page command 518. This eliminates one cycle from each additional read operation that is performed using the MRPA read extension same page command 518.

The example command truth table 500 depicts the technique of using a state of a CA bit (e.g., the CA6 bit) to indicate the semiconductor device (e.g., one or more mode registers in the semiconductor device) is to exit the MRPA mode (see highlighted area 540). This example technique is shown and described in more detail in conjunction with FIG. 6D. In a non-limiting nonexclusive example, the state is a low state, although other embodiments are not limited to this state. Other techniques that may be used to cause the semiconductor device to exit the MRPA mode are described in more detail in conjunction with FIG. 6B and FIG. 6C.

Figure 6D:
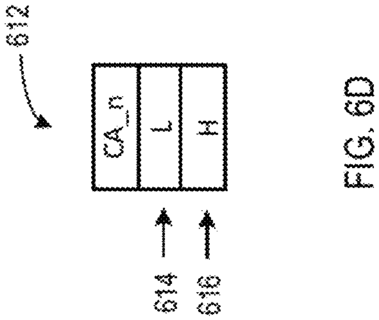
FIG. 6D illustrates a third technique for entering or exiting the mode register page access mode according to an embodiment of the disclosure.
Figure 6C:
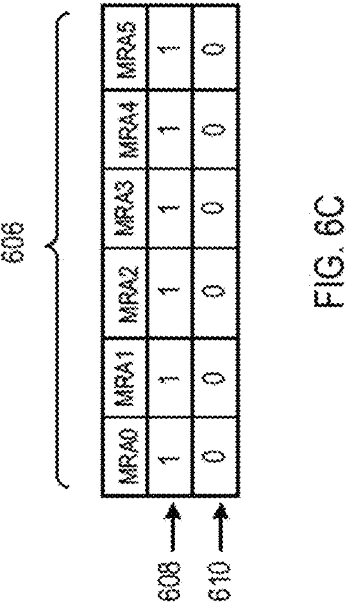
FIG. 6C illustrates a second technique for entering or exiting the mode register page access mode according to an embodiment of the disclosure.
Figure 6A:
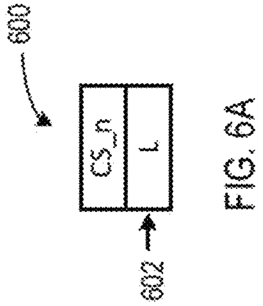
FIG. 6A illustrates a first technique for entering and remaining in the mode register page access mode according to an embodiment of the disclosure.

FIG. 6A illustrates a first technique for entering and remaining in the MRPA mode according to an embodiment of the disclosure. The external control signal 600 can be set to a particular state, such as a low (L) state 602, in the MRPA write same page command, the MRPA write extension same page command, the MRPA read same page command, and/or the MRPA read extension same page command. Examples of the use of the state of the external control signal are shown and described in conjunction with the MRPA write same page commands, the MRPA write extension same page commands, the MRPA read same page commands, and/or the MRPA read extension same page commands in FIG. 4 and FIG. 5.

Figure 6B:
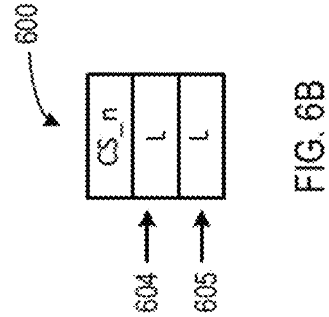
FIG. 6B illustrates a first technique for exiting the mode register page access mode according to an embodiment of the disclosure.

FIG. 6B illustrates a first technique for exiting the MRPA mode according to an embodiment of the disclosure. The external control signal 600 can be set to a particular state, such as a low (L) state, for multiple consecutive clock cycles in the MRPA write same page command, the MRPA write extension same page command, the MRPA read same page command, and/or in the MRPA read extension same page command. In FIG. 6B, the external control signal 600 is set to a low state in two consecutive clock cycles 604, 605 (e.g., two consecutive rising edges or falling edges). In a non-limiting nonexclusive example, the state of the external control signal in sub-row 438 (FIG. 4) can toggle to the L state (instead of the H state shown in FIG. 4) to indicate the semiconductor device is to exit the MRPA mode.

FIG. 6C illustrates a second technique for entering and/or exiting the MRPA mode according to an embodiment of the disclosure. The MRA bits (e.g., MRA0-MRA5 606) can all be set to one state, such as a H (e.g., "1") state 608, to cause the semiconductor device (e.g., cause one or more mode registers in the semiconductor device) to enter the MRPA mode. In one embodiment of the disclosure, the state of the external control signal may be used to cause the semiconductor device to remain in the MRPA mode. To exit the MRPA mode, the MRA bits may all be set to the opposite state, such as an L (e.g., "0") state 610. This technique can be used in the MRPA write same page command, the MRPA write extension same page command, the MRPA read same page command, and/or in the MRPA read extension same page command.

FIG. 6D illustrates a third technique for entering and/or exiting the MRPA mode according to an embodiment of the disclosure. A CA_n bit 612 can be set to a particular state, such as an L state 614, to cause the semiconductor device (e.g., cause one or more mode registers in the semiconductor device) to enter the MRPA mode. In some embodiments of the disclosure, the state of the CA_n bit 612 can remain in the same state to cause the semiconductor device to remain in the MRPA mode, or the state of the external control signal may be used to cause the semiconductor device to remain in the MRPA mode. To exit the MRPA mode, the CA_n bit may be set the opposite state, such as an H state 616. This technique can be used in the MRPA write same page command, the MRPA write extension same page command, the MRPA read same page command, and/or in the MRPA read extension same page command.

It is to be appreciated that any one of the examples, embodiments or processes described herein may be combined with one or more other examples, embodiments and/or processes or be separated and/or performed amongst separate devices or device portions in accordance with the present systems, devices and methods. For example, the various techniques for enter and exiting the MRPA mode may be combined. One embodiment of combined techniques is shown in FIG. 4 and FIG. 5 where the external control signal is used to cause the semiconductor device to enter the MRPA mode in both the mode register write same page and the mode register read same page, and the CA bit is used to cause the mode register to exit the MRPA mode. Additionally, although embodiments are described with the semiconductor device entering and exiting the MRPA mode, other embodiments are not limited to this implementation. The semiconductor device may perform operations without entering into a mode.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus, comprising:

external terminals configured to receive a plurality of commands associated with an operation, the operation comprising a mode register read operation or a mode register write operation; and one or more mode registers each configured to perform the operation, wherein:

a first command in the plurality of commands causes the apparatus to enter a mode register page access mode to enable the one or more registers to be accessed as a page, the first command providing a mode register page address and a mode register address in the mode register page to access; and a second command in the plurality of commands causes the apparatus to remain in the mode register page access mode and provides a subsequent mode register address in the mode register page to access.

2. The apparatus of claim 1, wherein a third command in the plurality of commands causes the apparatus to exit the mode register page access mode.

3. The apparatus of claim 2, wherein the third command comprises an external control signal set at a particular state to cause the apparatus to exit the mode register page access mode.

4. The apparatus of claim 1, wherein the first command and the second command are mode register page access commands that cause the apparatus to perform a mode register page access operation.

5. The apparatus of claim 1, wherein a fourth command in the plurality of commands is a direct mode register access command that causes the apparatus to perform a direct mode register access operation.

6. The apparatus of claim 1, wherein the first command comprises an external control signal set at a particular state to cause the apparatus to enter the mode register page access mode.

7. The apparatus of claim 1, wherein the second command comprises an external control signal set at a particular state to cause the apparatus to remain in the mode register page access mode.

8. The apparatus of claim 1, wherein the first command comprises one or more command address bits each set at a particular state to cause the apparatus to enter the mode register page access mode.

9. The apparatus of claim 8, wherein the one or more command address bits comprise multiple command address bits that define a mode register address.

10. The apparatus of claim 1, wherein the second command comprises one or more command address bits each set at a particular state to cause the apparatus to exit the mode register page access mode.

11. The apparatus of claim 10, wherein the one or more command address bits comprise multiple command address bits that define a mode register address.

12. The apparatus of claim 1, wherein the one or more mode registers comprise two or more mode registers that are associated with a similar function.

13. A method, comprising:

receiving a first command to perform a first operation of a first type, the first type comprising a mode register read operation or a mode register write operation;

based on the first command, causing a mode register to enter a mode register page access mode;

receiving a second command to perform a second operation of the first type; and based on the second command, causing the mode register to remain in the mode register page access mode, wherein:

the first command provides a mode register page address and a first mode register address in the mode register page to access; and the second command provides a second mode register address in the mode register page to access.

14. The method of claim 13, further comprising receiving a third command to cause the mode register to exit the mode register page access mode.

15. The method of claim 14, wherein the third command comprises an external control signal set at a particular state to cause the mode register to exit the mode register page access mode.

16. The method of claim 13, wherein:

the first command comprises an external control signal set at a particular state to cause the mode register to enter the mode register page access mode; or the second command comprises an external control signal set at a particular state to cause the mode register to remain in the mode register page access mode.

17. The method of claim 13, wherein:

the first command comprises one or more command address bits each set at a particular state to cause the mode register to enter the mode register page access mode; or the second command comprises one or more command address bits each set at a particular state to cause the mode register to exit the mode register page access mode.

18. The method of claim 13, wherein:

the first command comprises a plurality of mode register address bits each set at a particular state to cause the mode register to enter the mode register page access mode; or the second command comprises a plurality of mode register address bits each set at a particular state to cause the mode register to exit the mode register page access mode.

19. A controller configured to transmit commands to a memory device, the commands comprising:

a first command to cause the memory device to enter a mode register page access mode; and a second command to cause the memory device to remain in the mode register page access mode, wherein:

the first command comprises a first set of bits:

at least one bit in the first set of bits causes the memory device to enter the mode register page access mode;

a first portion of the first set of bits provides a mode register page address;

a second portion of the first set of bits provides a mode register address in the mode register page to access;

the second command comprises a second set of bits:

at least one bit in the second set of bits causes the memory device to remain in the mode register page access mode; and a third portion of the second set of bits provides a mode register address in the mode register page to access.

20. The apparatus of claim 19, wherein the at least one bit in the first set of bits is an external control signal.

21. The apparatus of claim 19, wherein the at least one bit in the second set of bits is an external control signal.

22. The apparatus of claim 19, wherein the at least one bit in the first set of bits comprises one or more command address bits.

23. The apparatus of claim 19, wherein the at least one bit in the second set of bits comprises one or more command address bits.

* * * * *